(12) United States Patent
Erner

(10) Patent No.: US 8,839,589 B2
(45) Date of Patent: Sep. 23, 2014

(54) AUTOMOTIVE GLAZING AND COMPONENT ASSEMBLY

(75) Inventor: Wolfgang Erner, Iserlohn (DE)

(73) Assignee: Pilkington Automotive Deutschland GmbH, Witten (DE)

( * ) Notice: Subject to any disclaimer, the term of this patent is extended or adjusted under 35 U.S.C. 154(b) by 0 days.

(21) Appl. No.: 12/921,633

(22) PCT Filed: Mar. 12, 2009

(86) PCT No.: PCT/EP2009/052910
§ 371 (c)(1),
(2), (4) Date: Sep. 9, 2010

(87) PCT Pub. No.: WO2009/112545
PCT Pub. Date: Sep. 17, 2009

(65) Prior Publication Data
US 2011/0047905 A1    Mar. 3, 2011

(30) Foreign Application Priority Data

Mar. 13, 2008 (GB) .................................. 0804595.7

(51) Int. Cl.
*E04C 2/38* (2006.01)
*B60J 1/02* (2006.01)
*B60J 10/00* (2006.01)
*B60J 10/02* (2006.01)

(52) U.S. Cl.
CPC .. *B60J 10/02* (2013.01); *B60J 1/02* (2013.01); *B60J 10/0071* (2013.01); *B60J 10/0011* (2013.01); *Y10S 277/921* (2013.01)
USPC .................... 52/717.01; 52/716.2; 52/717.03; 277/637; 277/651; 277/921; 49/489.1

(58) Field of Classification Search
USPC ......... 52/208, 204.53, 204.597, 716.2, 716.8, 52/717.01, 717.03; 296/216.09; 49/489.1, 49/492.1, 493.1; 277/630, 637, 651, 644, 277/921

See application file for complete search history.

(56) References Cited

U.S. PATENT DOCUMENTS

| 4,571,278 A | 2/1986 | Kunert |
| 4,606,159 A | 8/1986 | Kunert |

(Continued)

FOREIGN PATENT DOCUMENTS

| CN | 2936813 Y | 8/2007 |
| DE | 4308214 A1 | 9/1994 |

(Continued)

OTHER PUBLICATIONS translation of Xu (CN 2936813) provided by espacenet.*

(Continued)

*Primary Examiner* — Brian Glessner
*Assistant Examiner* — Brian D Mattei
(74) *Attorney, Agent, or Firm* — Buchanan Ingersoll & Rooney PC

(57) ABSTRACT

An automotive glazing having a mounting strip for mounting a glazing component attached adjacent at least one edge thereof is disclosed. The mounting strip comprises at least one ridge positioned in contact with the glazing such that the majority of the mounting strip is spaced apart from the glazing, forming a cavity. The mounting strip is bonded to a major face of the glazing by an adhesive material in contact with at least a portion of the mounting strip, and positioned such that it does not overlap the edge of the glazing. The ridge, the mounting strip end and the major face of the glazing to which the strip is bonded form a cavity having an open end facing the edge of the glazing, the cavity being dimensioned to receive a portion of said glazing component.

19 Claims, 4 Drawing Sheets

(56) References Cited

U.S. PATENT DOCUMENTS

| | | | |
|---|---|---|---|
| 4,738,482 A * | 4/1988 | Bohm et al. | 296/216.09 |
| 4,888,929 A * | 12/1989 | Vaughan et al. | 52/204.597 |
| 4,891,913 A * | 1/1990 | Shimura et al. | 49/493.1 |
| 4,933,032 A | 6/1990 | Kunert | |
| 4,938,521 A * | 7/1990 | Kunert | 296/96.21 |
| 4,956,941 A * | 9/1990 | Vaughan | 49/440 |
| 5,456,049 A | 10/1995 | Goto et al. | |
| 5,466,508 A * | 11/1995 | Brocke et al. | 428/122 |
| 5,551,197 A | 9/1996 | Repp et al. | |
| 5,577,798 A * | 11/1996 | Ichinohe et al. | 296/216.09 |
| 5,603,546 A * | 2/1997 | Desir, Sr. | 296/93 |
| 5,669,657 A * | 9/1997 | Miyazawa | 296/216.06 |
| 5,779,301 A | 7/1998 | Ito | |
| 5,809,706 A | 9/1998 | Neaux | |
| 5,851,045 A | 12/1998 | Muramatsu | |
| 6,334,646 B1 | 1/2002 | Oami | |
| 6,375,254 B1 * | 4/2002 | Patz | 296/216.09 |
| 6,769,700 B2 * | 8/2004 | Ortmuller et al. | 277/642 |
| 7,114,768 B2 * | 10/2006 | Aoki et al. | 296/216.09 |
| 7,156,455 B2 | 1/2007 | Iimori et al. | |
| 7,591,117 B2 * | 9/2009 | Kiriakou | 52/716.5 |
| 2001/0001972 A1 | 5/2001 | Soldner | |
| 2001/0034978 A1 | 11/2001 | Iimori et al. | |
| 2003/0057660 A1 | 3/2003 | Ortmuller et al. | |
| 2003/0090122 A1 | 5/2003 | Meizlish | |
| 2005/0218703 A1 | 10/2005 | Aoki et al. | |
| 2006/0232093 A1 | 10/2006 | Boehm et al. | |
| 2010/0244483 A1 * | 9/2010 | Erner et al. | 296/146.15 |
| 2011/0047905 A1 | 3/2011 | Erner | |

FOREIGN PATENT DOCUMENTS

| | | |
|---|---|---|
| DE | 19630177 A1 | 1/1998 |
| DE | 10022020 A1 | 2/2001 |
| DE | 199 39 191 A1 | 3/2001 |
| DE | 10017169 A1 | 3/2001 |
| DE | 102005012967 A1 | 12/2005 |
| DE | 10 2005 012 264 A1 | 9/2006 |
| EP | 0 545 896 B1 | 10/1994 |
| EP | 0 859 705 B1 | 2/2003 |
| EP | 1 526 019 A2 | 4/2005 |
| EP | 1 280 675 B1 | 3/2006 |
| EP | 1280675 B1 | 3/2006 |
| FR | 2 857 911 A1 | 1/2005 |
| JP | 1-128413 U | 9/1989 |
| JP | 51-85839 A | 7/1993 |
| JP | 5185839 A | 7/1993 |
| JP | H05-213072 A | 8/1993 |
| JP | 6-297962 A | 10/1994 |
| JP | 7-101238 A | 4/1995 |
| JP | 8-011550 A | 1/1996 |
| JP | S61-138612 U | 8/1996 |
| JP | 9-202142 A | 8/1997 |
| JP | 2001-310633 A | 11/2001 |
| JP | 2003-532574 A | 11/2003 |
| JP | 2005-289318 A | 10/2005 |
| JP | 2007203862 A | 8/2007 |
| WO | WO 01/85481 A1 | 11/2001 |

OTHER PUBLICATIONS

International Search Report (PCT/ISA/210) issued on Jun. 2, 2009, by European Patent Office as the International Searching Authority for International Application No. PCT/EP2009/052910.
UK Search Report Under Section 17 dated Sep. 7, 2007 issued in the corresponding Great Britain Patent Application No. GB0709316.4.
UK Search Report Under Section 17 dated Jul. 11, 2008 issued in the corresponding Great Britain Patent Application No. GB0709316.4.
International Search Report (PCT/IB/304) issued Jan. 12, 2009 in the corresponding International Application No. PCT/EP2008/055933.
Japanese Office Action dated Oct. 23, 2012 issued in the corresponding Japanese Patent Application No. 2010-507917 and partial English-language summary.
Chinese Notification of the Second Office Action dated Oct. 19, 2012 issued in the corresponding Chinese Patent Application No. 200980108806.X and English language translation.
English language translation of Japanese Second Official Action dated Feb. 25, 2014 issued in corresponding Japanese Patent Application No. 2010-550199.

* cited by examiner

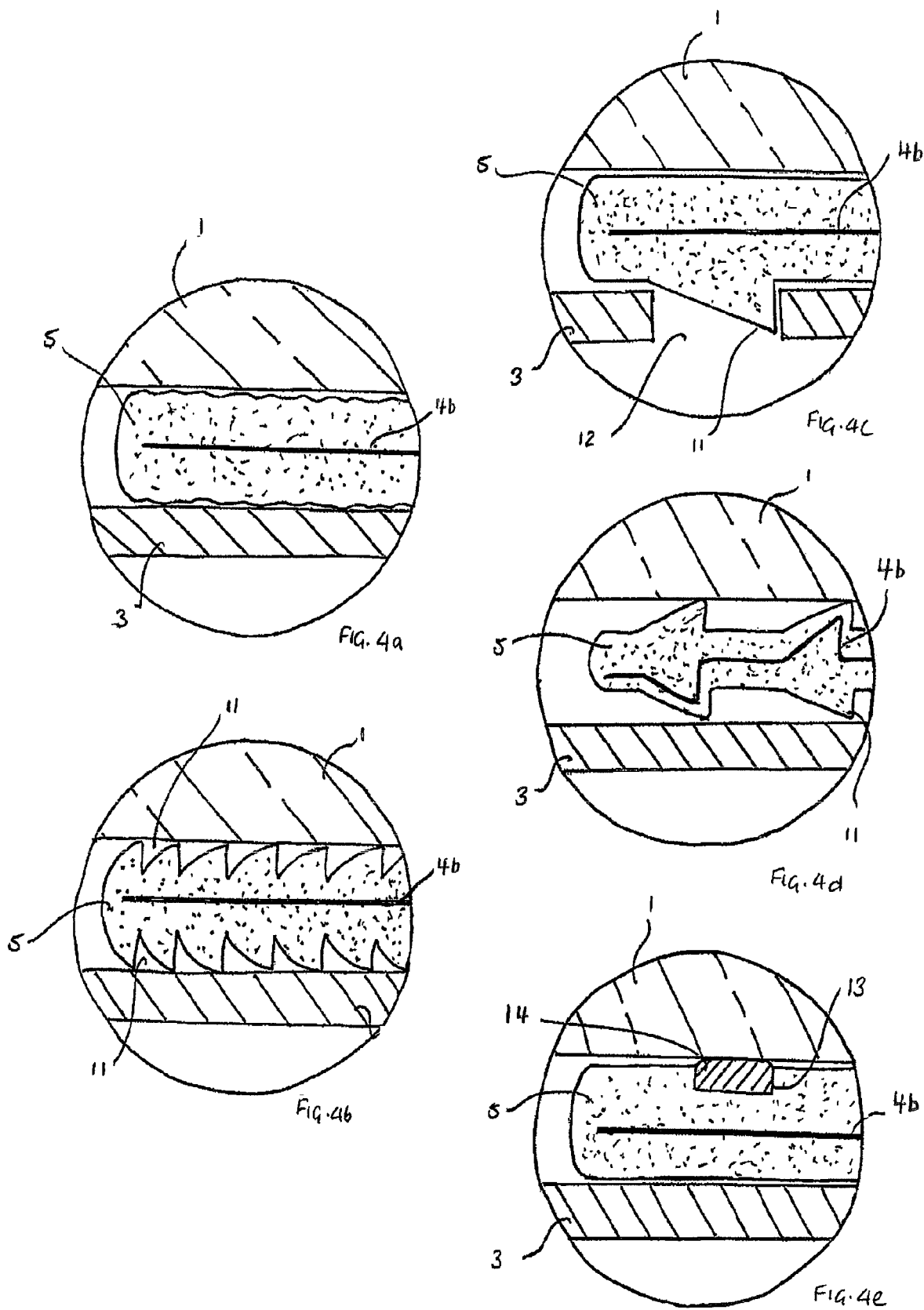

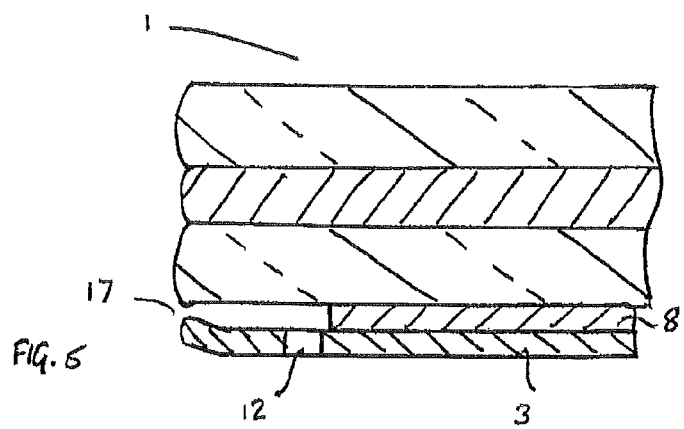
FIG. 5
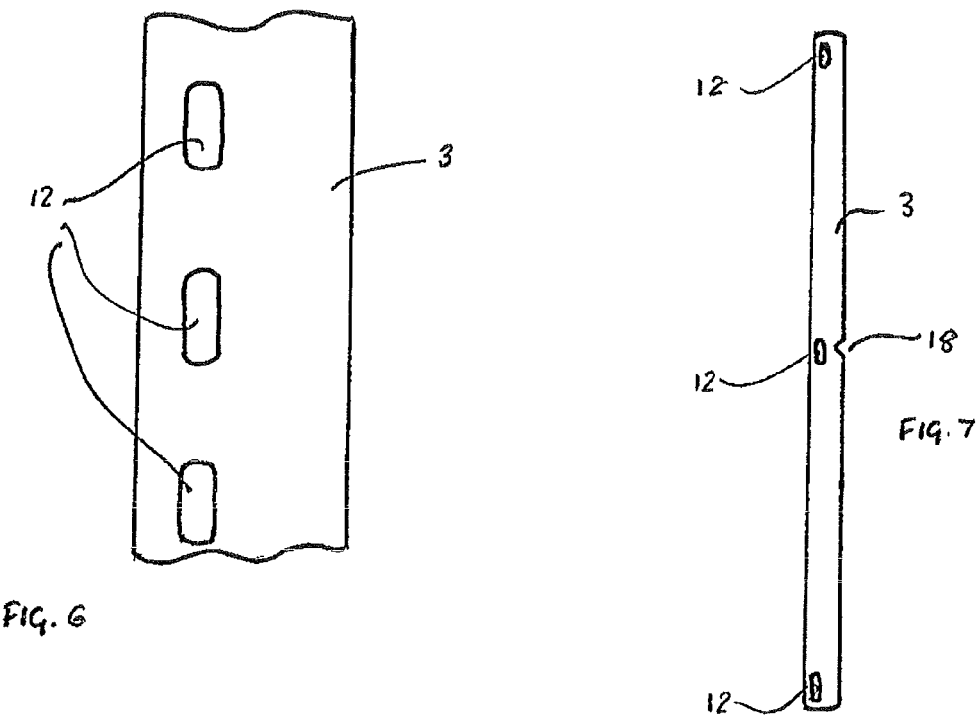
FIG. 6
FIG. 7
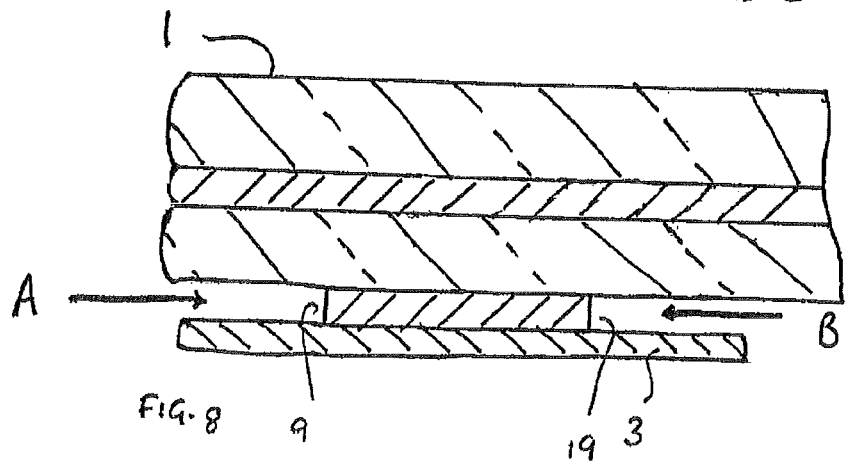
FIG. 8

AUTOMOTIVE GLAZING AND COMPONENT ASSEMBLY

The present invention relates to an automotive glazing, in particular, an automotive glazing having a glazing component mounting strip attached adjacent at least one edge.

When an automotive glazing is fitted into a vehicle, such as a car, it is vital that the seal between the glazing and the metal work of the car body is watertight. To help with this, the glazing is usually provided with a flexible gasket along at least one edge, which bears against the opening in the body of the vehicle, forming a seal, as described in EP 0 545 896 B1. However, for a windscreen or a backlight, it may also be necessary to provide additional glazing components, such as a cowling or water-tray along the lower edge of the glazing, where the glazing abuts the vehicle, so that water flowing off the windscreen is directed away from the interior of the vehicle.

A windscreen having a cowling attached along its lower edge is described in EP 1 280 675 B1. A moulded cowling comprising a plastic material, such as polypropylene, strengthened by a bent metal insert is mounted on a major face of the windscreen by means of a support or mounting profile. The mounting profile is glued onto the glazing, and the cowling clipped onto the mounting profile. The cowling is provided with a tray region for containing water that runs down the windscreen when wet, draining it away from the interior of the vehicle. The mounting profile is held in close contact with the edge of the windscreen, forming a waterproof join, by a self-adhesive tape. An adhesive bead is then moulded onto the periphery of the windscreen, overmoulding a portion of the cowling, providing further waterproofing and adhesive strength. Whilst this provides a good waterproof seal and firm bonding between the cowling and the windscreen, the cowling itself is bulky (up to 10 mm in height, typically double the thickness of the glazing to which it is attached), and extends beyond the periphery of the windscreen. This creates problems when transporting and storing the finished windscreen, as fewer parts can be stored and transported on a single rack. Consequently, storage and transportation costs are increased when compared with the windscreen alone.

An alternative manner of attaching a cowling to a glazing is described in DE 199 39 191 B4. A series of short 'L'-shaped profiles are mounted onto a major face of a laminated glazing using an adhesive, such as a one- or two-component polyurethane adhesive. These profiles are used to attach a cowling or water-tray, having holes to receive wipers, to the lower edge of the windscreen. The cowling clips into the 'L'-shaped profiles, and abuts the edge of the glazing. When mounted in a vehicle, water runs down the windscreen, into the water-tray, where it drains away. However, this method also suffers from the drawback that even though the glass may be stored with only the numerous 'L'-shaped profiles attached, this will still require greater storage space and consequential transport costs compared with the glazing alone, as the profiles extend both beyond the periphery of the glazing and a significant distance out of the horizontal plane of the glazing. In addition, the strength of the joint between the 'L'-shaped profiles and the surface of the glass is determined entirely by the adhesive properties of the polyurethane adhesive. Polyurethane adhesives require significant time to cure fully before reaching their maximum adhesive strength, and therefore the glazing cannot be transported or stored on racks until this curing is complete.

It is therefore desirable to be able to find a way to attach a glazing component, such as a cowling or water tray, or their mounting profiles, to an automotive glazing whilst minimising storage and transportation costs and ensuring that a strong bond between the glazing component and the glazing can be achieved quickly and reliably.

The present invention aims to address these problems by providing an automotive glazing having a mounting strip for mounting a glazing component attached adjacent at least one edge thereof, the mounting strip comprising at least one ridge positioned in contact with the glazing such that the majority of the mounting strip is spaced apart from the glazing, the mounting strip being bonded to a major face of the glazing by an adhesive material in contact with at least a portion of the mounting strip, the mounting strip being positioned such that it does not overlap the edge of the glazing, wherein the ridge, the mounting strip end and the major face of the glazing to which the strip is bonded form a cavity having an open end facing the edge of the glazing, the cavity being dimensioned to receive a portion of said glazing component.

By using a mounting strip that does not extend over the edge of the glazing, transportation costs can be reduced, as a greater number of glazings can be stored in a single rack. By providing a cavity into which a part, such as a retaining strip, of the glazing component, such as a cowling mounting profile, can be inserted, the mounting of the glazing component can be carried out quickly and reliably, with the guarantee of a good waterproof join when the component is fully inserted.

Preferably, the mounting strip comprises first and second ridges, spaced apart to define a channel adapted to receive the adhesive material.

Preferably, the mounting strip remains bonded to the surface of the glazing when subjected to a pull force of at least 100N, when applied at an angle of 90° to the surface of the glazing.

Preferably, the glazing comprises a single mounting strip along at least one edge.

Preferably, the adhesive is one requiring heat and pressure bonded to the mounting strip and the surface of the glazing.

Preferably the mounting strip comprises one of stainless steel or steel having a corrosion-resistant coating thereon.

The mounting strip may comprise at least one cut-out for engaging with a corresponding protrusion on the glazing component. The mounting strip may comprise a means such as a notch for centering the mounting strip on the glazing.

The mounting strip may have an upturned edge, facing in towards the major face of the glazing.

The adhesive and mounting strip may be positioned on the surface of the glazing to form a second cavity for receiving a second glazing component, the second cavity facing away from the edge of the glazing.

The glazing may further comprise a glazing component mounted on the glazing, the glazing component comprising a retaining strip dimensioned to fit and be inserted into the cavity. The retaining strip may comprise one of a plurality of protrusions or a roughened surface in contact with at least one of the glazing or the mounting strip. At least one protrusion may be dimensioned to fit within a cut-out region on the mounting strip. The retaining strip may comprise a metal insert embedded between layers of plastic material. The metal insert may reinforce at least one protrusion on the retaining strip.

Preferably, the glazing component is one of a cowling or water-tray mounting profile, a sealing profile, a dam profile or a spacer profile.

The present invention will now be described by way of example only, and with reference to the accompanying drawings in which:

FIG. 4a is a schematic cross section of a close up view of a first configuration of a part of FIG. 1;

FIG. 4b is a schematic cross section of a close up view of a second configuration of a part of FIG. 1;

FIG. 4c is a schematic cross section of a close up view of a third configuration of a part of FIG. 1;

FIG. 4d is a schematic cross section of a close up view of a fourth configuration of a part of FIG. 1;

FIG. 4e is a schematic cross section of a close up view of a fifth configuration of a part of FIG. 1;

FIG. 5 is a further schematic cross-section view of a mounting strip;

FIG. 6 is a schematic plan view of a portion of a mounting strip;

FIG. 7 is a schematic plan view of an entire mounting strip; and

FIG. 8 is a schematic cross-section of a mounting strip used to mount two glazing components at the same time.

In the present invention, it has been appreciated that in order to reduce storage and transportation costs, it is necessary to provide a way of attaching a glazing component such as a cowling or water-tray mounting profile to a glazing which does not require any fittings to extend either beyond the periphery of the glazing, or a significant distance out of the plane of the glazing during the transport of the glazing to the vehicle manufacturer. In the non-limiting example below, the glazing component mounted onto the surface of the glazing is a cowling or water tray mounting profile. The mounting profile holds the cowling in place when the glazing is fitted in a vehicle. Once the mounting strip is mounted on the glazing, the profile may be inserted. The cowling or water tray can then be clipped in or otherwise fixed to the profile. For other components, inserting the profile alone is sufficient, such as for a sealing profile.

Figure 1:
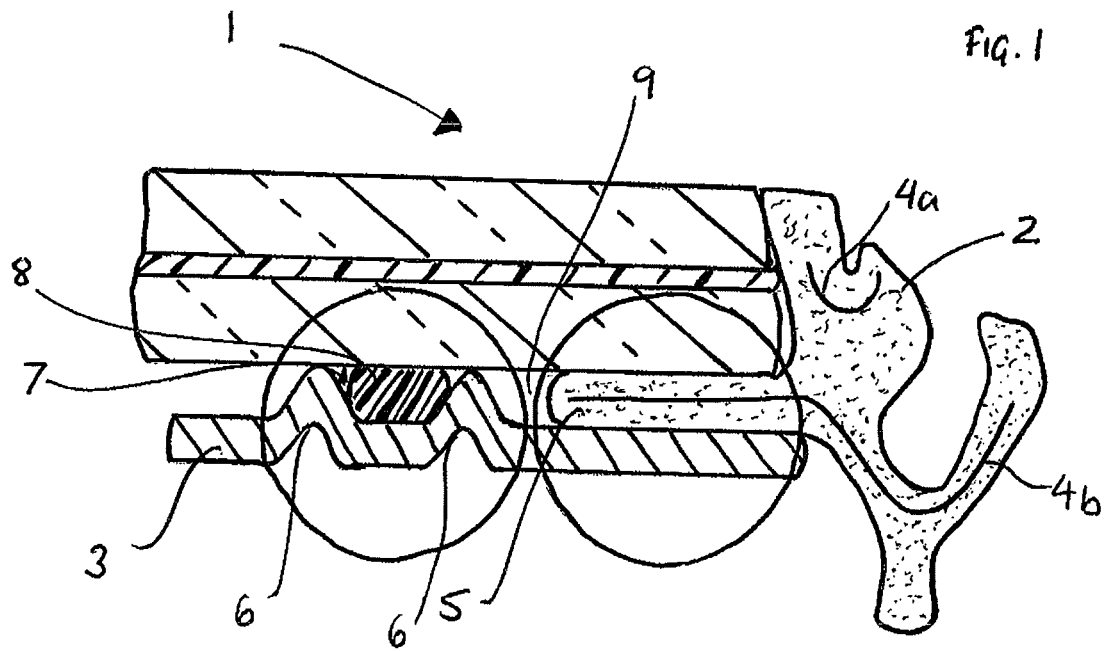
FIG. 1 is a schematic cross section of a glazing having a cowling mounting profile attached thereto in accordance with the present invention.

FIG. 1 is a schematic cross section of a glazing having a mounting profile for a cowling attached thereto in accordance with the present invention. A laminated glazing 1 (comprising first and second plies of glass having a co-extensive ply of an interlayer material of PVB or the like laminated therebetween) has a cowling mounting profile 2 attached by means of a mounting strip 3. A single mounting strip 3 is applied to at least one edge of the glazing 1, along each edge where a component will be mounted. The mounting profile 2 is generally formed of a plastic body having a pair of shaped metal inserts 4a, 4b embedded within for structure and strength, and comprises a receiving region for receiving a cowling. The mounting profile 2 also comprises a retaining strip 5, generally elongate in shape. The receiving region runs parallel to the edge of the glazing 1 when the mounting profile 2 is attached, and the retaining strip 5 contacts a major face of the glazing 1. The mounting strip 3 is formed of an elongate sheet of metallic material, such as stainless steel or steel having a corrosion resistant coating. The mounting strip 3 is contoured in shape, having first 6a and second 6b ridges defining a channel 7 for receiving an adhesive 8. The first 6a and second 6b ridges are formed from a pair of parallel rounded folds in the mounting strip 3, running along the length of the mounting strip 3 close to one long edge thereof. The first 6a and second 6b ridges are dimensioned in height to ensure that the majority, if not all, of the mounting strip 3 is spaced apart from the major face of the glazing 1 to which it is bonded, and to aid in forming a cavity 9 into which the retaining strip 5 is inserted and retained. A first ridge 6a forms an end wall of a three-sided structure forming an elongate cavity 9. The mounting strip 3 is spaced apart from the major face of the glazing 1, due to the first 6a and second 6b ridges, across substantially all of its width, forming a first side wall of the cavity 9 into which the retaining strip 5 is inserted. The major face of the glazing 1 to which the mounting strip 3 is bonded forms a second, oppositely facing, side wall to the cavity 9, such that the cavity 9 has an open end facing the edge of the glazing 1. The mounting strip 3 is positioned so as not to overlap the edge of the glazing 1, creating a free edge.

The mounting strip 3 is bonded to a major face of the glazing 1 by an adhesive 8. The adhesive is preferably on which when cured, is able to withstand a force applied to the mounting strip 3 of 100N, applied locally, at 90° to the plane of the mounting strip 3, to the free edge of the mounting strip 3. The adhesive should also be able to withstand a push force, applied parallel to the major face of the glazing, of at least 200N, to cope with the insertion of a glazing component during assembly. Suitable adhesives include those which may be autoclaved, such as strips of polyvinyl butyral interlayer material, in which case the mounting strip 3 may be bonded to the glazing 1 during the autoclaving processed used to laminate the plies of glass and interlayer material forming the glazing 1 together.

Figure 2:
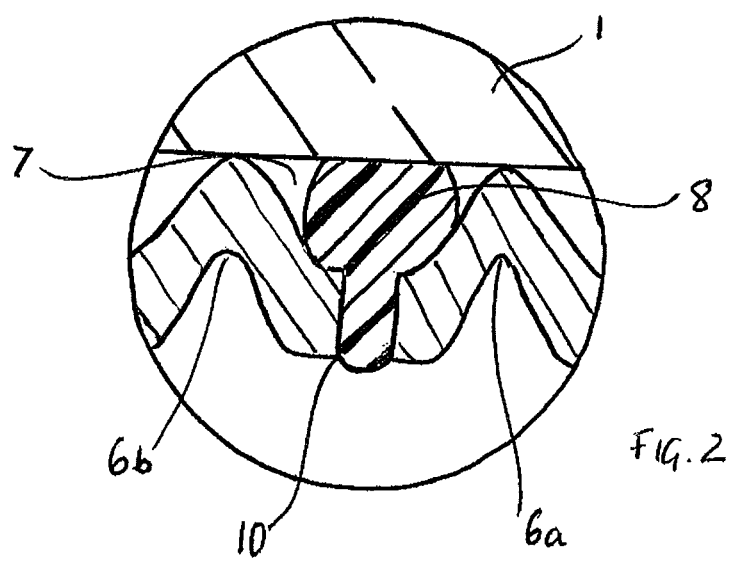
FIG. 2 is an enlarged schematic cross-section showing a portion of the mounting strip in FIG. 1 shown in greater detail.

FIG. 2 is an enlarged schematic cross-section showing a portion of the mounting strip in FIG. 1 shown in greater detail. The channel 7 defined by the first 6a and second 6b ridges has approximately equal height (defined as being the distance between the mounting strip 3 and the major face of the glazing 1) and width (maximum distance between the first 6a and second 6b ridges). However, the size of the channel 7 may be tailored according to the needs of a particular adhesive. It may also be desirable to include a number of small exit holes or an opening 10 at the base of the channel 7, for example, to aid in curing an adhesive.

Figure 3:
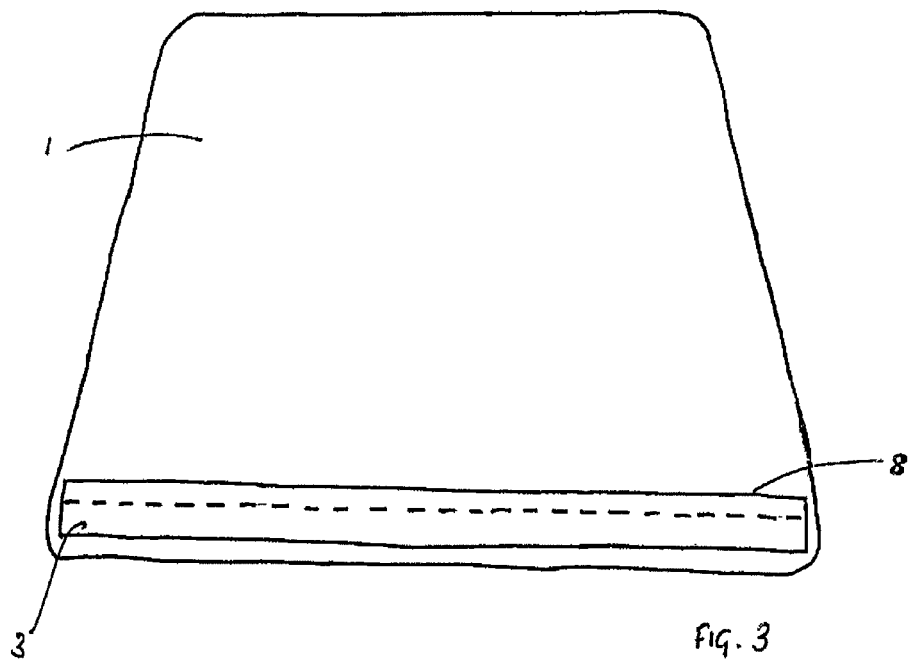
FIG. 3 is a schematic plan view of a glazing having a mounting strip attached in accordance with the present invention.

FIG. 3 is a schematic plan view of a glazing having a mounting strip attached in accordance with the present invention. The glazing 1 is generally trapezoidal in shape, and has the mounting strip 3 bonded to a major face by an adhesive 8 (the position of which is shown by the dotted line). The mounting strip 3 lies inward of the edge of the glazing 1, so that the cavity 9 extends along the length of the mounting strip 3 and faces outwards towards the edge of the glazing 1. The mounting strip 3 is elongate, and dimensioned and optionally curved to fit the edge of the glazing 1 to which it is bonded.

Once the adhesive 8 used to bond the mounting strip 3 to a major face of the glazing 1 has cured or cooled, the retaining strip 5 of mounting profile 2 may be inserted into the cavity 9, such that the mounting profile 2 abuts the edge of the glazing 1, forming a waterproof seal. The positioning of the adhesive 8 and mounting strip 3, and therefore the first 6a and second 6b ridges, can be altered to take into account tolerances in the shape and size of the mounting profile 2. However, it is not necessary to insert the mounting profile 2 immediately, and the glazing 1 may be stored or transported with only the mounting strip 3 bonded thereto, and the mounting profile 2 fitted subsequently in a factory at or near where the glazing 1 will be fitted into a vehicle. By providing a mounting strip 3 which extends in total only about 3 to 4 mm out of the plane of the glazing, up to 40% more glazings may be stored on a rack compared with glazings having a cowling fitted in a conventional manner, such as that described in EP 1 280 675 B1.

Figure 4F:
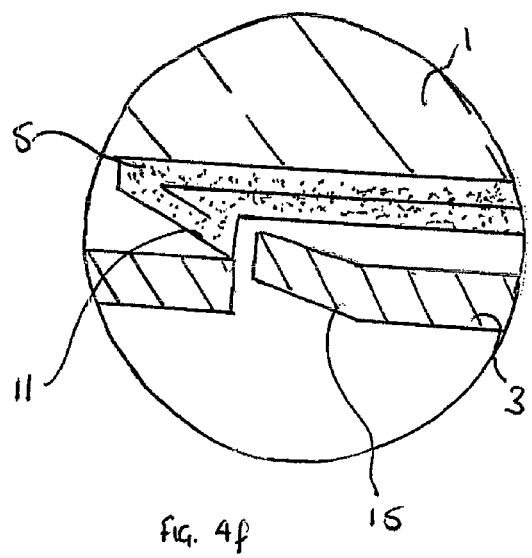
FIG. 4f is a schematic cross section of a close up view of a sixth configuration of a part of FIG. 1.

The strength of the bond between the mounting profile 2 and the glazing 1, and the integrity of the waterproof seal can be improved by optimising the design of the retaining strip 5. FIGS. 4a to 4g show schematic cross sections of a close up view of a first to a seventh configuration of a part of FIG. 1, highlighting the retaining strip 5. By increasing the roughness of the retaining strip 5, not only is the mounting profile 2 more able to withstand a pull force in the plane of the glazing 1, but it will be held in closer, more resilient, abutment with the edge of the glazing 1. FIG. 4a illustrates a retaining strip 5 having a roughened surface, for engaging with both the major face of the glazing 1 and the mounting strip 3. FIG. 4b illustrates a retaining strip 5 having a series of grooves along its upper and lower surfaces, creating protrusions 11 that contact both the major surface of the glazing 1 and the mounting strip 3.

FIG. 4c illustrates both a modified retaining strip 5 and a modified mounting strip 3. The mounting strip 3 is provided with a cut-out region 12 into which a corresponding protrusion 11 on the lower edge of the retaining strip fits. The protrusion 11 comprises a sloping surface, such that the mounting profile 2 may be inserted into the cavity 9 formed by the mounting strip 3, the first ridge 6a and the glazing 1 by sliding, and a vertical surface that engages with one edge of the cut-out region 12, preventing removal of the mounting profile 2 after insertion.

FIG. 4d illustrates a variation of the retaining strip design shown in FIG. 4b. In this case, the protrusions 11 are partially reinforced by the metal insert 4b having a shaped structure, providing support for alternating protrusions 11.

FIG. 4e shows a further modification to the retaining strip 5, in which a cavity 13 is provided on the upper surface of the retaining strip 5 (in contact with the glazing 1), which may be filled with an additional adhesive 14. This may provide further resistance to removal of the retaining strip 7 from the cavity 9 during service of the glazing 1.

Figure 4G:
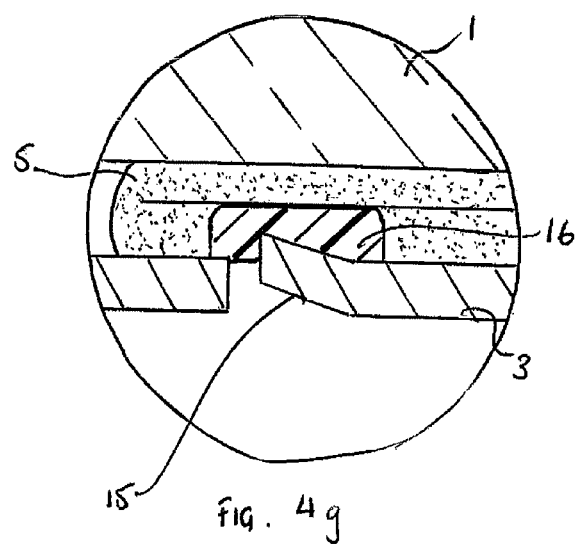
FIG. 4g is a schematic cross section of a close up view of a seventh configuration of a part of FIG. 1.

FIG. 4f shows a further modification to both the retaining strip 5 and the mounting strip 3. A toothed region 15 is provided in the mounting strip 3, by punching out a 3-sided region of the strip 3. The toothed region 15 creates a simple ratchet system, where a protrusion 11 on the retaining strip may engage with the toothed region 15, preventing removal of the retaining strip 5 from the glazing 1. FIG. 4g shows a variation on the retaining strip 5 shown in FIG. 4f. Rather than having a protrusion 11, the retaining strip 5 has a region 16 of a softer material than the main body of the retaining strip, into which the toothed region 15 is embedded when the retaining strip 5 is inserted into the cavity 9. If the retaining strip 5 is formed from polypropylene, for example, a suitable softer material is TPE (thermoplastic elastomer).

In each example shown, the retaining strip 5 comprises a metal insert 4b, having a thickness in the range of about 0.2 to 0.3 mm, embedded between layers of a plastic material each having a thickness of at least about 0.2 mm. Preferably, the retaining strip 5 is less than or equal to 2 mm in thickness, more preferably less than or equal to 1.5 mm in thickness.

Preferably, the mounting strip 3 has a thickness in the range 0.5 mm to 2 mm, and the first 6a and second 6b ridges having a height in the range 0.5 mm to 2.0 mm, corresponding to the dimensions of the elongate retaining strip 5 of the mounting profile 2. However, the thickness (and width) of the adhesive 8 should also be such that after bonding, the mounting strip 3 is able to withstand a pull force applied locally at 90° to the plane of the mounting strip at a free edge of the mounting strip 3 of at least 100N, preferably at least 150N, and remain bonded to the surface of the glazing.

Preferably, the adhesives used are those which require heat and pressure to form a strong bond, and therefore can be autoclaved. Such suitable adhesives include laminates of epoxy and acrylic films, for example, adhesives 9270 and 9214 available from 3M. Alternatively, other adhesives, such as two-component adhesives requiring inductive heating, and two-component epoxy resins may be used instead. If PVB is used as an adhesive, a 20 mm wide strip of a 0.76 mm to 1.5 mm thick strip of PVB may bear a local load of about 500N. "Standard PVB" having a constant cross-section or "wedge PVB" having a slightly wedge-shaped cross-section may be used to bond the mounting strip 3 at an angle to the glazing 1. By creating a cavity 9 in which the distance between the mounting strip 3 and the glazing 1 is smaller at the open end of the cavity 9 than at the closed end, additional frictional force is brought to bear on the retaining strip 5, maintaining its position within the cavity 9 during use.

The mounting strip 3 is preferably formed from a metal strip having a thickness in the range 1 mm to 2.5 mm, preferably about 1 mm, comprising a corrosion resistant material, such as stainless steel, or a steel strip having a corrosion resistant coating applied all around after cutting to size. The strip may be press bent, rolled or cast, as desired. One advantage of using a metal strip, compared to a plastics strip, as the mounting strip, is that metals such as stainless steel and glass have much closer coefficients of thermal expansion, reducing the chances of thermal shock breakage of the glazing and decreasing the height of the first 6a and second 6b ridges as necessary to compensate the different expansion coefficients of metal, adhesive and glass. The choice of dimensions may also have the beneficial effect of increasing the packing density of glazings for transportation even further. In addition, it may be desirable for different parts of the mounting strip to be formed from different materials, or using different processes. For example, the end portions of each strip may be vehicle specific, and formed from pressed steel, and the central portion generic, and farmed from rolled steel.

Possible configurations of the mounting strip 3 are shown in more detail in FIGS. 5, 6 and 7. FIG. 5 is a schematic cross-section view of a mounting strip 3 having both a cut-out region 12 for receiving a protrusion positioned on the retaining strip, and an upturned edge 17 (the edge is spaced closer to the glazing than the main body of the mounting strip 3) adjacent the edge of the glazing 1. By providing an upturned edge, additional frictional force may be applied to the retaining strip 5, maintaining the position of the mounting profile 2 during the lifetime of the glazing.

FIG. 6 shows a schematic close-up plan view of the mounting strip 3, illustrating the positions of a plurality of cut-out regions 12 that correspond to the positions of the protrusions 11 (as shown in FIG. 4c). FIG. 7 is a schematic plan view of an entire elongate mounting strip 3, comprising three cut-out regions 12: one at each opposing end of the mounting strip 3 and one central cut-out region 12, positioned equidistant from the other two cut-out regions 12. A locating notch 18 is also provided, adjacent the central cut-out region 12, allowing the mounting strip 3 to be centered on the glazing 1 easily by reference to a (not shown) corresponding reference marking on the glazing 1. Although in FIG. 7 the mounting strip 3 is shown as having parallel edges, it is desirable that the mounting strip 3 has a generally curved shape to match the generally curved edge of the glazing 1 adjacent to which it will be mounted. The long edges of the retaining strip 3 may be spaced an equal distance apart along their entire length, or a varying distance apart, depending on the glazing component to be mounted to the glazing 1.

Although the example described above uses the mounting strip 3 to mount a cowling mounting profile 2 onto the edge of a glazing 1, the mounting strip 3 may also be used to mount other glazing components or their mounting profiles onto automotive glazings. Preferably, the glazing component is one of a cowling or water tray mounting profile, a sealing profile, a dam profile (damming the adhesive by which the glazing is fixed to the car body) or a spacer profile (for example, for spacing the glazing from a car body flange). Glazing components provided with a flat extension to form a retaining strip 5 may be inserted into the cavity 9 formed by the mounting strip 3, first 6a and second 6b ridges and the glazing 1. FIG. 8 is a schematic cross-section view of a mounting strip 3 used to mount two glazing components at the same time. As illustrated in FIG. 8, further components may be mounted onto the glazing 1 at the same time as the glazing component to be attached to the edge of the glazing 1, by positioning the mounting strip 3 such that two cavities, 9 and 19 are formed: one (9) facing to and positioned adjacent the edge of the glazing 1, formed from a first edge of the mounting strip 3 and having the first ridge 6a forming an end wall; and one (19) facing away from the edge of the glazing 1, formed from the opposite edge of the mounting strip 3 and having the second ridge 6b forming an end wall. The glazing components may be inserted with their respective retaining strips into each cavity in opposite directions, as indicated by arrows A and B. This enables several components to be mounted firmly to the surface of a glazing with only one mounting strip, along one or several of the edges of the glazing. Consequently, the mounting strip 3 may be used to mount glazing components or mounting profiles onto any automotive glazing, either laminated or single-ply, such as windscreens, backlights, sidelights and rooflights.

The invention claimed is:

1. An automotive glazing made of glass having a mounting strip and a glazing component mounted to the mounting strip adjacent at least one edge of the glazing, the mounting strip comprising at least one ridge positioned in contact with a major face of the glazing such that the majority of the mounting strip is spaced apart from the major face of the glazing, the mounting strip being bonded to the major face of the glazing by an adhesive material in contact with at least a portion of the mounting strip, the mounting strip being positioned such that it does not extend beyond the periphery of the glazing, wherein a cavity having an open end facing the edge of the glazing is formed solely by the ridge, the mounting strip end and the major face of the glazing to which the strip is bonded, wherein the glazing component comprises a retaining strip dimensioned to fit and be inserted into the cavity in contact with both the major face of the glazing and the mounting strip, a portion of the glazing component being flush with a second major face of the glazing opposite the major face of the glazing in contact with the retaining strip, and wherein the mounting strip applies a frictional force to the retaining strip to maintain its position in the cavity.

2. A glazing according to claim 1, wherein the mounting strip comprises first and second ridges, spaced apart to define a channel adapted to receive the adhesive material.

3. A glazing according to claim 1, wherein the mounting strip remains bonded to the surface of the glazing when subjected to a pull force of at least 100N, when applied at an angle of 90° to the surface of the glazing.

4. A glazing according to claim 1, wherein the glazing comprises a single mounting strip along at least one edge.

5. A glazing according to claim 1, wherein the adhesive is one requiring heat and pressure bonded to the mounting strip and the surface of the glazing.

6. A glazing according to claim 1, wherein the mounting strip comprises one of stainless steel or steel having a corrosion-resistant coating thereon.

7. A glazing according to claim 1, wherein the mounting strip comprises at least one cut-out for engaging with a corresponding protrusion on the glazing component.

8. A glazing according to claim 1, wherein the mounting strip comprises a means centering the mounting strip on the glazing.

9. A glazing according to claim 1, wherein the mounting strip has an upturned edge facing in towards the major face of the glazing.

10. A glazing according to claim 1, wherein the adhesive and mounting strip are positioned on the surface of the glazing to form a second cavity for receiving a second glazing component, the second cavity facing away from the edge of the glazing.

11. A glazing according to claim 1, wherein the retaining strip comprises one of a plurality of protrusions or a roughened surface in contact with at least one of the glazing or the mounting strip.

12. A glazing according to claim 11, wherein at least one protrusion is dimensioned to fit within a cut-out region on the mounting strip.

13. A glazing according to claim 1, wherein the retaining strip comprises a metal insert embedded between layers of plastic material.

14. A glazing according to claim 13, where the metal insert reinforces at least one protrusion on the retaining strip.

15. A glazing according to claim 1, wherein the glazing component is one of a cowling or water-tray mounting profile, a sealing profile, a dam profile or a spacer profile.

16. A glazing according to claim 8, wherein the means for centering the mounting strip on the glazing comprises a notch.

17. A laminated automotive windshield comprising at least one ply of glass and having a mounting strip and a water-tray mounting profile mounted to the mounting strip adjacent at least one edge of the laminated automotive windshield, the mounting strip comprising at least one ridge positioned in contact with the laminated automotive windshield such that the majority of the mounting strip is spaced apart from the laminated automotive windshield, the mounting strip being bonded to a major face of the laminated automotive windshield by an adhesive material in contact with at least a portion of the mounting strip, the mounting strip being positioned such that it does not extend beyond the periphery of the laminated automotive windshield, wherein a cavity having an open end facing the edge of the laminated automotive windshield is formed solely by the ridge, the mounting strip end and the major face of the laminated automotive windshield to which the strip is bonded, and wherein the water-tray mounting profile comprises a retaining strip dimensioned to fit and be inserted into the cavity in contact with both the major face of the laminated automotive windshield and the mounting strip, a portion of the water-tray mounting profile being flush with a second major face of the glazing opposite the major face of the glazing in contact with the retaining strip, and wherein a portion of the mounting strip having a through hole is in contact with the adhesive material, or the retaining strip is in contact with a portion of the mounting strip defining at least one tooth.

18. A method of attaching a glazing component to an automotive glazing made of glass having a mounting strip attached adjacent at least one edge thereof, the mounting strip comprising at least one ridge positioned in contact with a major face of the glazing such that the majority of the mounting strip is spaced apart from the major face of the glazing, the mounting strip being bonded to the major face of the glazing by an adhesive material in contact with at least a portion of the mounting strip, the mounting strip being positioned such that it does not extend beyond the periphery of the glazing, wherein a cavity having an open end facing the edge of the glazing is formed solely by the ridge, the mounting strip end and the major face of the glazing to which the strip is bonded, the method comprising:

pre-forming the glazing component; and inserting a retaining strip of the pre-formed glazing component into the cavity in contact with both the major face of the glazing and the mounting strip whereby a portion of the pre-formed glazing component is flush with a second major face of the glazing opposite the major face of the glazing in contact with the retaining strip.

19. The method of claim 18, wherein the mounting strip applies a frictional force to the retaining strip of the glazing component to maintain its position in the cavity.

\* \* \* \* \*